United States Patent
Han et al.

(10) Patent No.: US 7,733,862 B2
(45) Date of Patent: Jun. 8, 2010

(54) METHOD AND APPARATUS FOR IMPLEMENTING IPSEC ENGINE IN IXDP2851

(75) Inventors: Min Ho Han, Daejeon (KR); Ki Young Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 512 days.

(21) Appl. No.: 11/449,334

(22) Filed: Jun. 8, 2006

(65) Prior Publication Data
US 2007/0133538 A1 Jun. 14, 2007

(30) Foreign Application Priority Data
Dec. 9, 2005 (KR) .................. 10-2005-0120993

(51) Int. Cl.
*H04L 12/28* (2006.01)

(52) U.S. Cl. .................. 370/392; 709/225; 709/233; 713/153; 726/14

(58) Field of Classification Search .............. 726/3, 726/14; 713/150
See application file for complete search history.

(56) References Cited

U.S. PATENT DOCUMENTS
7,398,386 B2 * 7/2008 Kessler et al. .............. 713/150

OTHER PUBLICATIONS

Network Working Group, Requirements for IP Version 4 Routers, Jun. 1995, Cisco Systems, F. Baker, pp. 1, 96.*
Telecomworldwire, Intel Reveals New Network Processor- Intel's IXP2850 Network Processor, Oct. 16, 2002.*

* cited by examiner

*Primary Examiner*—Ayaz R Sheikh
*Assistant Examiner*—Nicholas Sloms
(74) *Attorney, Agent, or Firm*—Ladas & Parry LLP

(57) ABSTRACT

Provided are an apparatus and method for implementing an IPSec engine in IXDP2851. The apparatus for implementing an IPSec engine in IXDP2851 which is an IXP2850 network processor development platform, includes: a packet classifier/forwarding microblock classifying packets into an inbound packet and an outbound packet, using received packet information; determining whether IPSec processing should be performed on the inbound packet and the outbound packet, and performing packet forwarding on a packet not requiring the IPSec processing; an outbound IPSec processing microblock; an inbound IPSec processing microblock; and an IPSec forwarding microblock receiving packet information of a packet subjected to IPSec processing and performing forwarding on the corresponding packet. Therefore, by separately processing packets requiring IPSec processing and packets not requiring IPSec processing, it is possible to implement an IPSec engine without influencing a processing speed of general packets not requiring IPSec processing.

9 Claims, 6 Drawing Sheets

METHOD AND APPARATUS FOR IMPLEMENTING IPSEC ENGINE IN IXDP2851

CROSS-REFERENCE TO RELATED PATENT APPLICATIONS

This application claims the benefit of Korean Patent Application No. 10-2005-0120993, filed on Dec. 9, 2005, in the Korean Intellectual Property Office, the disclosure of which is incorporated herein in its entirety by reference.

BACKGROUND OF THE INVENTION

1. Field of the Invention

The present invention relates to a method for implementing an IPSec engine in IXDP2851, and more particularly, to an apparatus and method for processing an IPSec protocol in IXDP2851, which are capable of implementing an IPSec engine without influencing a speed of processing general packets not requiring IPSec processing by separately processing packets requiring IPSec processing and packets not requiring IPSec processing.

2. Description of the Related Art

Network processors such as IXP2850 are used in network equipments requiring high speed data processing, and provide a function of upgrading existing algorithms or adding algorithms through a program.

FIG. 1 is a block diagram schematically showing the structure of IXDP2851 which is a conventional IXP2850 network processor development platform.

Referring to FIG. 1, IXDP2851 100, which is an IXP2850 network processor development platform, includes an Ethernet MAC 120 and an IXP2850 network processor 140. Here, the IXP2850 network processor 140 is manufactured by Intel Corporation.

The Ethernet MAC 120, which is an Ethernet interface card, receives or transmits data from or to a network.

The IXDP2851 100 can construct a new application using the IXP2850 network processor 140.

In detail, for example, Quality of Service (QoS), Multiprotocol Label Switching (MPLS), etc. can be constructed using the IXDP2851 100.

However, a method and apparatus for implementing Internet Protocol Security (IPSec) which is a security protocol in a packet processing layer of network communication through such a network processor development platform IXDP2851 100, have not been developed.

SUMMARY OF THE INVENTION

The present invention provides a method and apparatus of implementing an IPSec engine in IXDP2851, which are capable of implementing an IPSec engine without influencing a speed of processing general packets not requiring IPSec processing by transferring only packets requiring IPSec processing to a microengine in which IPSec engine operates by checking IP headers before packet routing.

According to an aspect of the present invention, there is provided an apparatus for implementing an IPSec engine in IXDP2851 which is an IXP2850 network processor development platform, including: a packet classifier/forwarding microblock classifying packets into an inbound packet in which a destination address of an IP header of the inbound packet indicates the packet classifier/forwarding microblock and an outbound packet in which a destination address of an IP header of the outbound packet does not indicate the packet classifier/forwarding microblock, using received packet information, determining whether IPSec processing should be performed on the inbound packet and the outbound packet, and performing packet forwarding on a packet not requiring the IPSec processing; an outbound IPSec processing microblock performing IPSec processing on an outbound packet requiring IPSec processing according to packet information received from the packet classifier/forwarding microblock; an inbound IPSec processing microblock performing IPSec processing on an inbound packet requiring IPSec processing according to the packet information received from the packet classifier/forwarding microblock; and an IPSec forwarding microblock receiving packet information of a packet subjected to IPSec processing from the outbound IPSec processing microblock and/or the inbound IPSec processing microblock, and performing forwarding on the corresponding packet.

According to another aspect of the present invention, there is provided a method for implementing an IPSec engine in IXDP2851 which is an IXP2850 network processor development platform, including: (a) if an IP header of a packet corresponding to received packet information is valid, determining whether the packet is an inbound packet in which a destination address of the IP header of the packet indicates a packet classifier/forwarding microblock, or an outbound packet in which the destination address of the IP header of the packet does not indicate the packet classifier/forwarding microblock, in the packet classifier/forwarding microblock; (b) if it is determined that the packet is the inbound packet, determining whether IPSec processing should be performed on the inbound packet, and transmitting information regarding the inbound packet to an inbound IPSec processing microblock if the IPSec processing should be performed on the inbound packet; (c) if it is determined that the packet is the outbound packet, determining whether IPSec processing should be performed on the outbound packet, and transmitting information regarding the outbound packet to an outbound IPSec processing microblock if the IPSec processing should be performed on the outbound; and (d) if IPSec processing for the outbound packet is not required, performing packet forwarding on the outbound packet and adding an Ethernet header to the packet subjected to the packet forwarding.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 2:
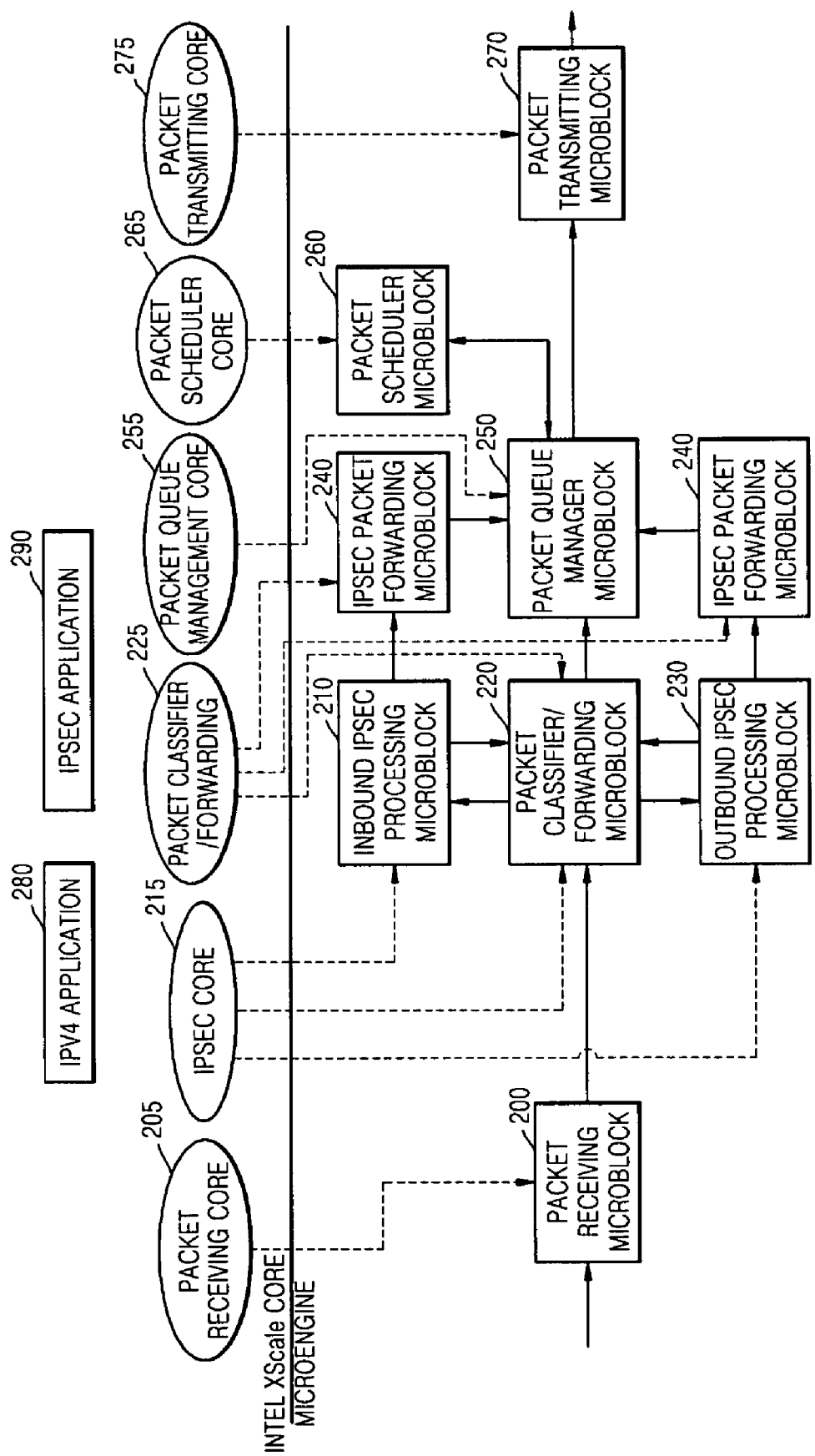
FIG. 2 is a view showing the structure of an IXP2850 network processor according to an embodiment of the present invention.

FIG. 2 is a view showing the structure of an IXP2850 network processor according to an embodiment of the present invention.

Referring to FIG. 2, the IXP2850 network processor includes 6 core components and 8 microblocks.

The 6 core components are a packet receiving core 205, an IPSec core 215, a packet classifier/forwarding core 225, a packet queue manager core 255, a packet scheduler core 265, and a packet transmitting core 275.

The 8 microblocks are a packet receiving microblock 200, an inbound IPSec processing microblock 210, a packet classifier/forwarding microblock 220, an outbound IPSec processing microblock 230, an IPSec packet forwarding microblock 240, a packet queue manager microblock 250, a packet scheduler microblock 260, and a packet transmitting microblock 270.

Figure 1:
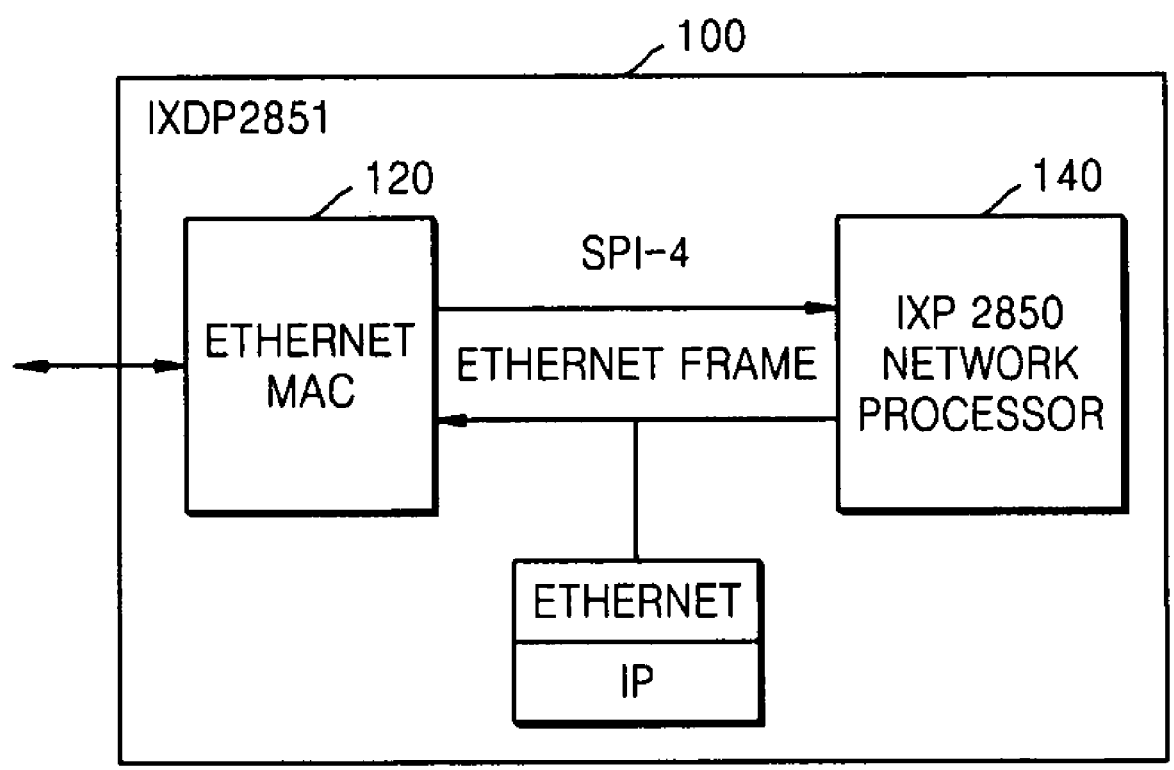
FIG. 1 is a block diagram schematically showing the structure of IXDP2851 which is a conventional IXP2850 network processor development platform.

The packet receiving microblock 200 receives and regroups packets through an Ethernet MAC (120 of FIG. 1), writes the packets in a DRAM (not shown) existing in IXDP2851, and then transfers information regarding the packets to the packet classifier/forwarding microblock 220.

The packet classifier/forwarding microblock 220 removes Ethernet headers of the packets existing in the DRAM using the packet information received from the packet receiving microblock 200, and performs validation checking and updating (TTL reduction, checksum recalculation) on IP headers according to RFC1812 (Ethernet Decap).

Also, the packet classifier/forwarding microblock 220 determines whether IPSec processing should be performed on a packet and performs packet forwarding on packets not requiring IPSec processing using a routing table.

The operation of the packet classifier/forwarding microblock 220 will be described in detail with reference to FIG. 3.

The inbound IPSec processing microblock 210 receives information of an inbound packet from the packet classifier/forwarding microblock 220, reads an actual packet existing in the DRAM, performs IPSec processing on the actual packet, and writes the resultant packet in the DRAM. Then, the inbound IPSec processing microblock 210 transmits information regarding the inbound packet subjected to the IPSec processing to the IPSec packet forwarding microblock 240.

Here, the inbound IPSec processing microblock 210 obtains information (for example, an IPSec protocol to be applied to the packet, an algorithm and key value to be used, etc.) required for the IPSec processing of the packet from a policy table and a Security Association (SA) table, and obtains an algorithm required for encryption and authentication of the packet from a cryptography engine of the IXP2850 network processor.

The outbound IPSec processing microblock 230 receives information of an outbound packet from the packet classifier/forwarding microblock 220, reads an actual packet existing in the DRAM, performs IPSec processing on the packet, and writes the resultant packet in the DRAM. Then, the outbound IPSec processing microblock 230 transmits information regarding the outbound packet subjected to IPSec processing to the IPSec packet forwarding microblock 240.

Here, the outbound IPSec processing microblock 230 obtains information (for example, an IPSec protocol to be applied to the packet, an algorithm and key value to be used, etc.) required for IPSec processing of the packet from the policy table and the SA table, and obtains an algorithm required for encryption and authentication of the packet from a cryptography engine of the IXP2850 network processor.

The IPSec packet forwarding microblock 240 receives the information regarding the packet subjected to the IPSec processing from the inbound IPSec processing microblock 210 and the outbound IPSec processing microblock 230, performs forwarding on the received packet, adds an Ethernet header to the resultant packet, and then transmits the information regarding the packet to the packet queue manager microblock 250. In FIG. 2, two IPSec packet forwarding microblocks 240 of an IPSec packet forwarding microblock 240 connected to the inbound IPSec processing microblock 210 and an IPSec packet forwarding microblock 240 connected to the outbound IPSec processing microblock 230 are shown. However, actually, the two IPSec packet forwarding microblocks 240 are integrated into one unit.

The packet scheduler microblock 260 schedules packets to be transmitted to the packet transmitting microblock 270, among packets received from the packet queue manager microblock 250.

The packet queue manager microblock 250 receives information regarding the forwarded packets from the packet classifier/forwarding microblock 220 or the IPSec packet forwarding microblock 240, and transmits information regarding the packets scheduled by the packet scheduler microblock 260 to the packet transmitting microblock 270.

The packet transmitting microblock 270 receives the information regarding the packets from the packet queue manager microblock 250 and transmits an actual packet existing in the DRAM through the Ethernet interface.

The respective microblocks perform their functions in the corresponding independent microengines. Also, the microblocks use scratchpad rings in order to communicate with each other, that is, in order to transmit information regarding packets existing in the DRAM. The communication between the microblocks through the scratchpad rings will be described in detail with reference to FIG. 3.

The respective microblocks can communicate with each other through various methods other than the communication through the scratchpad rings.

The IPv4 application 280 is an application program related to packet routing, and the IPSec application 290 is a key exchange application program related to IPSec.

The packet receiving core 205, the IPSec core 215, the packet classifier/forwarding core 225, the packet queue manager core 255, the packet scheduler core 265, and the packet transmitting core 275 provide a function of assigning memories which the microblocks existing in the microengines will use, a function of initializing symbol patches, etc., and a function of managing data to be used when the microblocks process packets.

Figure 3:
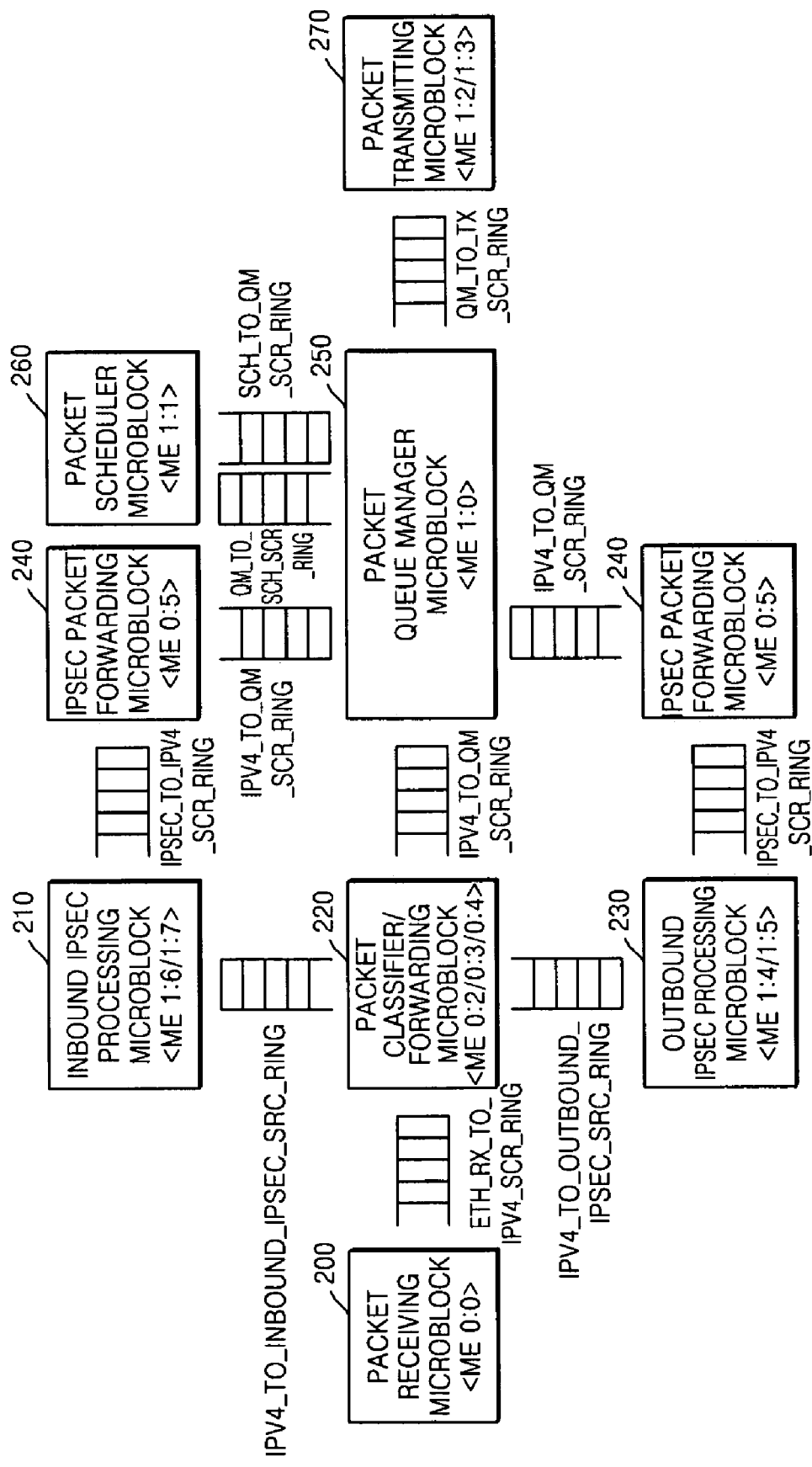
FIG. 3 is a view showing the structure of microblocks and scratchpad rings for implementing an IPSec engine according to an embodiment of the present invention.

FIG. 3 is a view showing the structure of microblocks and scratchpad rings for implementing an IPSec engine according to an embodiment of the present invention.

Referring to FIG. 3, the respective microblocks performs their operations in different microengines, and scratchpad rings are used to transmit data between the microblocks.

The Intel IXP2850 network processor is composed of 16 microengines, and a relationship between microblocks and microengines for implementing an IPSec engine is shown in table 1.

TABLE 1

| Microblock | Microengine |
|---|---|
| Packet receiving microblock | ME 0:0 |
| Packet classifier/forwarding microblock | ME 0:2, ME 0:3, ME 0:4 |
| Inbound IPSec processing microblock | ME 1:6, ME 1:7 |
| Outbound IPSec processing microblock | ME 1:4, ME 1:5 |
| IPSec packet forwarding microblock | ME 0:5 |
| Packet scheduler microblock | ME 1:1 |
| Packet queue manager microblock | ME 1:0 |
| Packet transmitting microblock | ME 1:2, ME 1:3 |

Actual packets are stored in buffers of the DRAM, and information regarding the packets is stored in buffers of SRAM. The microblocks transmit a packet buffer handle and some information regarding the packet through the scratchpad rings, and obtains information required for processing the packet using the information, so that the microblocks can access an actual packet.

A ring ETH_RX_TO_IPV4_SCR_RING is formed between the paket classifier/forwarding microblock 220 and the packet receiving microblock 200, to transmit packet information from the packet receiving microblock 200 to the packet classifier/forwarding microblock 220. That is, the packet receiving microblock 200 stores the packet information in the ring ETH_RX_TO_IPV4_SCR_RING, and the packet classifier/forwarding microblock 220 fetches the packet information stored in the ring ETH_RX_TO_IPV4_SCR_RING.

The packet classifier/forwarding microblock 220 fetches the packet information from the packet receiving microblock 200 and removes an Ethernet header of an actual packet existing in the DRAM.

Then, the packet classifier/forwarding microblock 220 performs validation checking of an IP header on the packet from which the Ethernet header is removed. The validation checking of the IP header is performed by determining whether the IP header satisfies the REC1812 specification. If the IP header does not satisfy the REC1812 specification, the packet information and the related packet fetched from the packet receiving microblock 200 are discarded in the DRAM.

Then, the packet classifier/forwarding microblock 220 updates the IP header of the packet subjected to the validation checking. Here, the updating of the IP header is to reduce TTL and recalculate a check sum.

Then, the packet classifier/forwarding microblock 220 determines whether IPSec processing should be performed on the packet.

Figure 5:
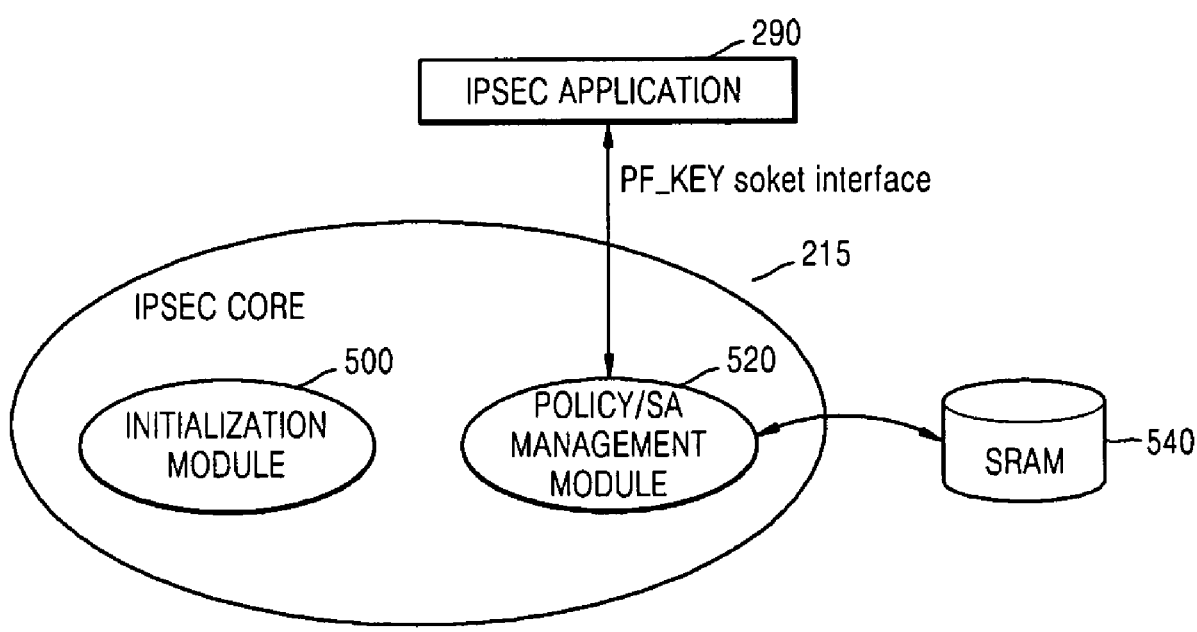
FIG. 5 is a view detailedly showing an IPSec core illustrated in FIG. 2.

In detail, the packet classifier/forwarding microblock 220 determines whether a destination address of the IP header indicates the packet classifier/forwarding microblock 220. Here, if the destination address of the IP header indicates the packet classifier/forwarding microblock 220 and a value of a protocol field is an Encapsulating Security Payload (ESP) 50 or an Authentication Header (AH) 51, a Security Association (SA) table is searched and the packet information is transmitted to the inbound IPSec processing microblock 210 if the IPSec processing is required (that is, if SA for the packet exists in the SA table). Here, the SA table, as illustrated in FIG. 5, is stored in the SRAM 540 of IXDP2851. Meanwhile, if it is determined as the search result of the SA table that there is no SA to be applied, that is, if it is determined that the IPSec processing is not required, the packet is discarded in the DRAM.

Meanwhile, if the destination address of the IP header does not indicate the packet classifier/forwarding microblock 220, a policy table is searched using the address of the IP header and information regarding the packet is transmitted to the IPSec processing microblock 230 if IPSec processing is required. Here, the policy table, as illustrated in FIG. 5, is stored in the SRAM 540 of IXDP2851. Meanwhile, if it is determined as the search result of the policy table that there is no policy to be applied (that is, if a policy for the packet does not exist in the policy table), the packet is directly subjected to packet forwarding using a routing table without IPSec processing, an Ethernet header is added to the packet, and information regarding the packet to which the Ethernet header is added is transmitted to the packet queue manager microblock 250 through the ring IPV4_TO_QM_SCR_RING.

The operation of the packet classifier/forwarding microblock 220 will be described in detail with reference to FIGS. 4A and 4B.

A ring IPV4_TO_INBOUND_IPSEC_SRC_RING is formed between the packet classifier/forwarding microblock 220 and the inbound IPSec processing microblock 210 to transmit information regarding packets requiring IPSec processing from the packet classifier/forwarding microblock 220 to the inbound IPSec processing microblock 210. That is, the packet classifier/forwarding microblock 220 stores the information regarding packets requiring IPSec processing in the ring IPV4_TO_INBOUND_IPSEC_SRC_RING, and the inbound IPSec processing microblock 210 fetches the information regarding the packets requiring IPSec processing stored in the ring IPV4_TO_INBOUND_IPSEC_SRC_RING.

The inbound IPSec processing microblock 210 performs IPSec processing using the information regarding the packets stored in the ring IPV4_TO_INBOUND_IPSEC_SRC_RING.

A ring IPSEC_TO_IPV4_SCR_RING is formed between the inbound IPSec processing microblock 210 and the IPSec packet forwarding microblock 240, to transmit the information regarding packets subjected to IPSec processing from the bound IPSec processing microblock 210 to the IPSec packet forwarding microblock 240. That is, the inbound IPSec processing microblock 210 stores the information regarding the packets subjected to the inbound IPSec processing in the ring IPSEC_TO_IPV4_SCR_RING, and the IPSec packet forwarding microblock 240 fetches the information regarding the packets subjected to IPSec processing stored in the ring IPSEC_TO_IPV4_SCR_RING.

A ring IPV4_TO_OUTBOUND_IPSEC_SRC_RING is formed between the packet classifier/forwarding microblock 220 and the outbound IPSec processing microblock 230, to transmit the information regarding packets requiring IPSec processing from the packet classifier/forwarding microblock 220 to the outbound IPSec processing microblock 230. That is, the packet classifier/forwarding microblock 220 stores the information regarding packets requiring IPSec processing in the ring IPV4_TO_OUTBOUND_IPSEC_SRC_RING, and the outbound IPSec processing microblock 230 fetches the information regarding packets requiring IPSec processing stored in the ring IPV4_TO_OUTBOUND_IPSEC_SRC_RING.

The outbound IPSec processing microblock 230 fetches the information regarding the packets stored in the ring IPV4_TO_OUTBOUND_IPSEC_SRC_RING and performs IPSec processing.

A ring IPSEC_TO_IPV4_SCR_RING is formed between the outbound IPSec processing microblock 230 and the IPSec packet forwarding microblock 240, to transmit the information regarding packets subjected to IPSec processing from the outbound IPSec processing microblock 230 to the IPSec packet forwarding microblock 240. That is, the outbound IPSec processing microblock 230 stores the information regarding packets subjected to IPSec processing in the ring IPSEC_TO_IPV4_SCR_RING, and the IPSec packet forwarding microblock 240 fetches the information regarding the packets subjected to outbound IPSec processing stored in the ring IPSEC_TO_IPV4_SCR_RING.

A ring IPV4_TO_QM_SCR_RING is formed between the packet classifier/forwarding microblock 220 and the packet queue manager microblock 250, to transmit information regarding packets directly forwarded in the packet classifier/forwarding microblock 220 from the packet classifier/forwarding microblock 220 to the packet queue manager microblock 250. That is, the packet classifier/forwarding microblock 220 stores information regarding packets directly forwarded in the ring IPV4_TO_QM_SCR_RING, and the packet queue manager microblock 250 fetches information regarding the forwarded packets stored in the ring IPV4_TO_QM_SCR_RING.

Also, a ring IPV4_TO_QM_SCR_RING is formed between the IPSec packet forwarding microblock 240 and the packet queue manager microblock 250, to transmit information regarding packets subjected to IPSec processing from the IPSec packet forwarding microblock 240 to the packet queue manager microblock 250. That is, the IPSec packet forwarding microblock 240 stores information regarding packets subjected to IPSec processing in the ring IPV4_TO_QM_SCR_RING, and the packet queue manager microblock 250 fetches the information regarding packets subjected to IPSec processing stored in the ring IPV_TO_QM_SCR_RING.

A ring QM_TO_SCH_SCR_RING is formed between the packet queue manager microblock 250 and the packet scheduler microblock 260, to transmit packet information received from the packet queue manager microblock 250 from the packet queue manger microblock 250 to the packet scheduler microblock 260. That is, the packet queue manager microblock 250 stores the received packet information in the ring QM_TO_SCH_SCR_RING, and the packet scheduler microblock 260 fetches the packet information transmitted to the packet queue manager microblock 250 stored in the ring QM_TO_SCH_SCR_RING.

Then, a ring SCH_TO_QM_SCR_RING is formed between the packet queue manager microblock 250 and the packet scheduler microblock 260, to transmit packet information packet-scheduled by the packet scheduler microblock 260 from the packet scheduler microblock 260 to the packet queue manager microblock 250. That is, the packet scheduler microblock 260 stores the packet-scheduled packet information in the ring SCH_TO_QM_SCR_RING, and the packet queue manager microblock 250 fetches the packet-scheduled packet information stored in the ring SCH_TO_QM_SCR_RING.

Also, a ring QM_TO_TX_SCR_RING is formed between the packet queue manager microblock 250 and the packet transmitting microblock 270, to transmit information of packets scheduled by the packet scheduler microblock 260, that is, information of packets to be transmitted, from the packet queue manager microblock 250 to the packet transmitting microblock 270. That is, the packet queue manager microblock 250 stores the information of packets to be transmitted in the ring QM_TO_TX_SCR_RING, and the packet transmitting microblock 270 fetches the information of the packets stored in the ring QM_TO_TX_SCR_RING.

The packet transmitting microblock 270 receives the information regarding the packets from the packet queue manager microblock 250 and transmits an actual packet existing in the DRAM through the Ethernet interface.

In FIG. 3, two IPSec packet forwarding microblocks 240 of an IPSec packet forwarding microblock 240 connected to the inbound IPSec processing microblock 210 and an IPSec packet forwarding microblock 240 connected to the outbound IPSec processing microblock 230 are shown. However, actually, the two IPSec packet forwarding microblocks 240 are integrated into one unit.

Also, two rings IPSEC_TO_IPV4_SCR_RING of a ring connected to the inbound IPSec processing microblock 210 and a ring connected to the outbound IPSec processing microblock 230 are shown. However, actually, the two rings IPSEC_TO_IPV4_SCR_RING are integrated into one unit.

Also, three rings IPV4_TO_QM_SCR_RING of a ring connected between the packet classifier/forwarding microblock 220 and the packet queue manger microblock 250 and two rings connected between the IPSec packet forwarding microblock 240 and the packet manager microblock 250 are shown. However, actually, the three rings IPV4_TO_QM_SCR_RING are integrated into one unit.

Figure 4A:
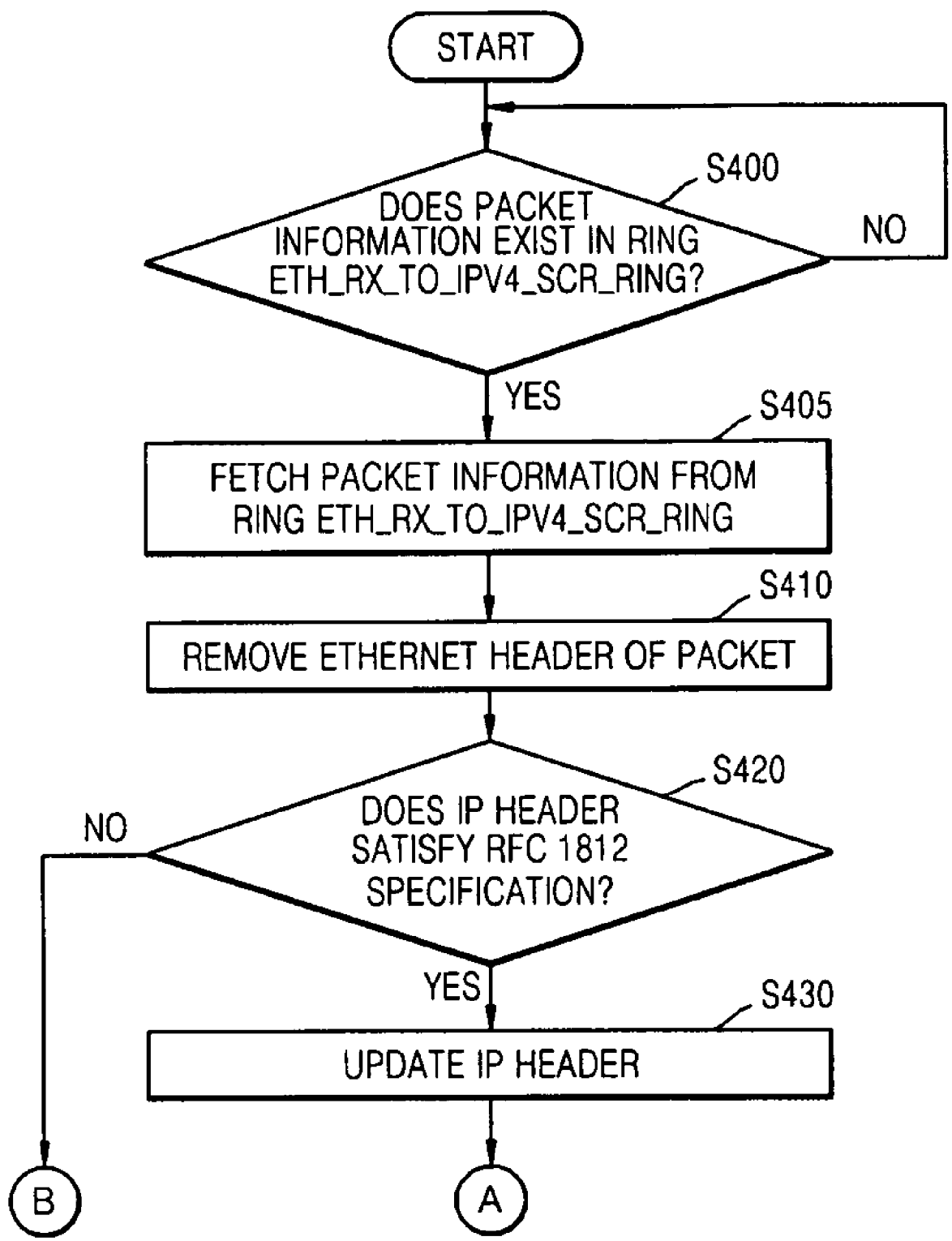
FIGS. 4A and 4B are a flowchart detailedly illustrating a packet processing method performed by a packet classifier/forwarding microblock illustrated in FIG. 3.
Figure 4B:
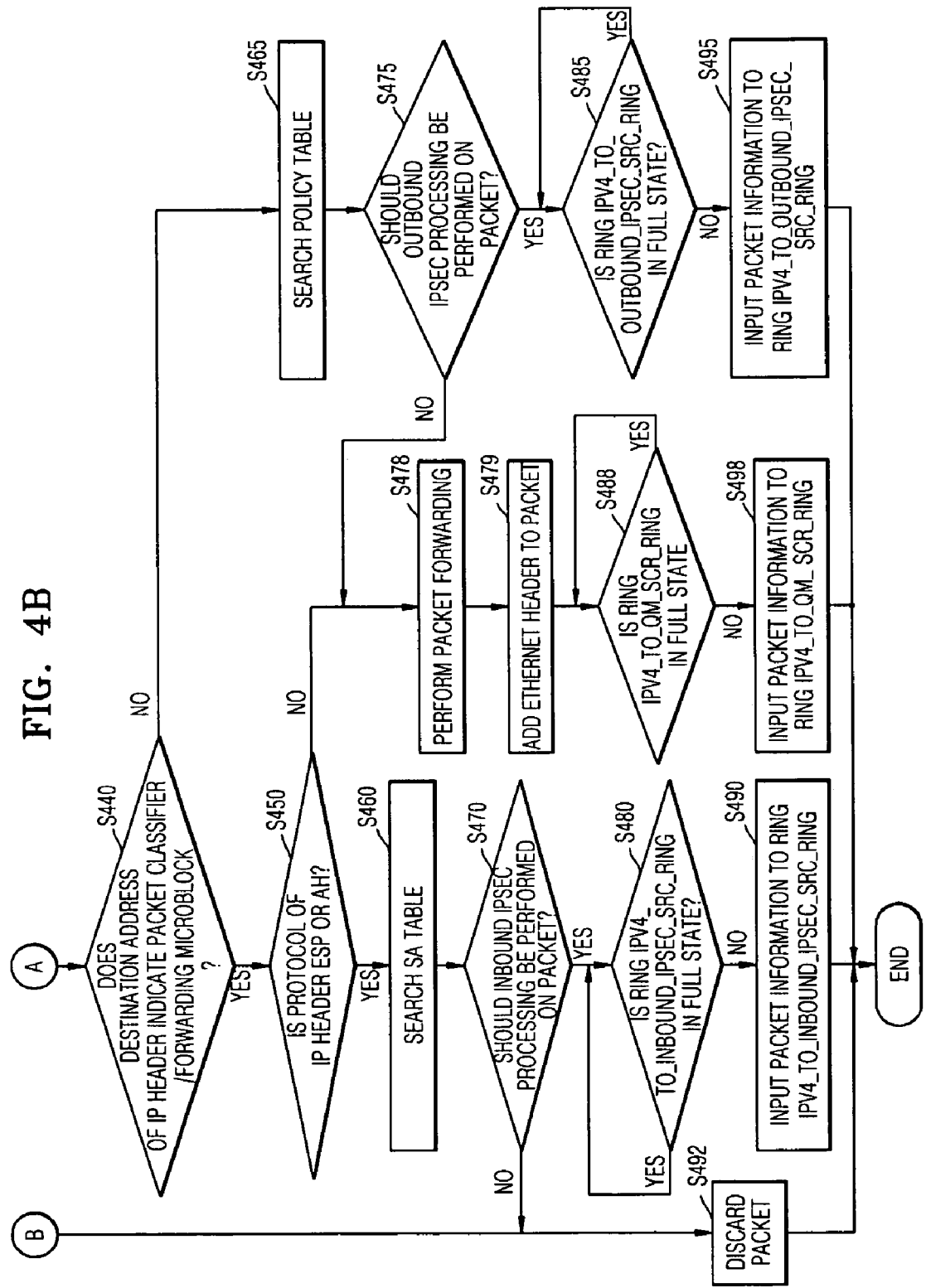

FIGS. 4A and 4B are a flowchart detailedly illustrating a packet processing method performed by the packet classifier/forwarding microblock 220 illustrated in FIG. 3.

Referring to FIGS. 4A and 4B, first, the packet classifier/forwarding microblock 220 determines whether information regarding packets exists in a ring ETH_RX_TO_IPV4_SCR_RING between the packet receiving microblock 200 and the packet classifier/forwarding microblock 220 (operation S400) If it is determined in operation S400 that no information regarding packets exists in the ring ETH_RX_TO_IPV4_SCR_RING, operation S400 is repeated. Meanwhile, if it is determined in operation S400 that information regarding packets exists in the ring ETH_RX_TO_IPV4_SCR_RING, the process proceeds to operation S405.

In operation S405, the information regarding the packets is fetched from the ring ETH_RX_TO_IPV4_SCR_RING.

Then, in operation S405, an Ethernet header of a packet actually existing in the DRAM is removed on the basis of the information regarding the packets received in operation S405 (operation S410).

Then, it is determined whether an IP header of the packet is valid (operation S420). Here, the determination on whether the IP header is valid is performed by determining whether the IP header from which the Ethernet header is removed satisfies the RFC1812 specification.

If it is determined in operation S420 that the IP header is not valid, the process proceeds to operation S492 and the packet actually existing in the DRAM is discarded. Meanwhile, if it is determined in operation S420 that the IP header is valid, the process proceeds to operation S430.

In operation S430, the IP header is updated. Here, updating the IP header is performed by reducing TTL and recalculating a check sum.

Then, it is determined whether a destination address of the IP header indicates the packet classifier/forwarding microblock 220 (operation S440).

If it is determined in operation S440 that the destination address of the IP header indicates the packet classifier/forwarding microblock 220, the process proceeds to operation S450. Meanwhile, if it is determined in operation S440 that the destination address of the IP header does not indicate the packet classifier/forwarding microblock 220, the process proceeds to operation S465.

In operation S465, the policy table is searched using the address of the IP header to determine whether IPSec processing should be performed.

Then, it is determined whether outbound IPSec processing should be performed on the packet (operation S475).

If it is determined in operation S475 that the outbound IPSec processing is not required for the packet, the process proceeds to operation S478. Meanwhile, if it is determined in operation S475 that the outbound IPSec processing should be performed on the packet, the process proceeds to operation S485.

In operation S485, it is determined whether the capacity of the ring IPV4_TO_OUTBOUND_IPSEC_SRC_RING between the packet classifier/forwarding microblock 220 and the outbound IPSec processing microblock 230 is in a full state.

If it is determined in operation S485 that the capacity of the ring IPV4_TO_OUTBOUND_IPSEC_SRC_RING is in a full state, the process returns to operation S485. Meanwhile, if it is determined in operation S485 that the capacity of the ring IPV4_TO_OUTBOUND_IPSEC_SRC_RING is not in a full state, the process proceeds to operation S495.

In operation S495, information regarding the packet is input to the ring IPV4_TO_OUTBOUND_IPSEC_SRC_RING between the packet classifier/forwarding microblock 220 and the outbound IPSec processing microblock 230. Thus, the outbound IPSec processing microblock 230 fetches the information regarding the packet stored in the ring IPV4_TO_OUTBOUND_IPSEC_SRC_RING and performs IPSec processing.

Meanwhile, in operation S450, it is determined whether a protocol of the IP header is ESP 50 or AH 51.

If it is determined in operation S450 that the protocol of the IP header is ESP 50 or AH 51, the process proceeds to operation S460. Meanwhile, if it is determined in operation S450 that the protocol of the IP header is neither ESP 50 nor AH 51, the process proceeds to operation S478.

The case when it is determined in operation S450 that the protocol of the IP header is neither ESP 50 nor AH 51 and the case when it is determined in operation S475 that the outbound IPSec processing is not required for the packet, the process proceeds to operation S478 so that packet forwarding is performed using a routing table and an Ethernet header is added to the packet.

Then, it is determined whether the capacity of the ring IPV4_TO_QM_SCR_RING between the packet classifier/forwarding microblock 220 and the packet queue manager microblock 250 is in a full state (operation S488).

If it is determined in operation S488 that the capacity of the ring IPV4_TO_QM_SCR_RING is in a full state, the process returns to operation S488. Meanwhile, if it is determined in operation S488 that the capacity of the ring IPV4_TO_QM_SCR_RING is not in a full state, the process proceeds to operation S498.

In operation S498, information regarding the packet is input to the ring IPV4_TO_QM_SCR_RING between the packet classifier/forwarding microblock 220 and the packet queue manager microblock 250. Thus, the packet queue manager microblock 250 fetches the information regarding the packet stored in the ring IPV4_TO_QM_SCR_RING.

Meanwhile, if the destination address of the IP header indicates the packet classifier/forwarding microblock 220 and the protocol of the IP header is ESP 50 or AH 51, the process proceeds to operation S460 and the SA table is searched.

After operation S460, it is determined whether inbound IPSec processing should be performed on the packet (operation S470).

If it is determined in operation S470 that inbound IPSec processing is not required for the packet, the process proceeds to operation S492 and the packet is discarded in the DRAM. Meanwhile, if it is determined in operation S470 that inbound IPSec processing should be performed on the packet, the process proceeds to operation S480.

In operation S480, it is determined whether the capacity of the ring IPV4_TO_INBOUND_IPSEC_SRC_RING between the packet classifier/forwarding microblock 220 and the inbound IPSec processing microblock 210 is in a full state.

If it is determined in operation S480 that the capacity of the ring IPV4_TO_INBOUND_IPSEC_SRC_RING is in a full state, the process returns to operation S480. Meanwhile, if it is determined in operation S480 that the capacity of the ring IPV4_TO_INBOUND_IPSEC_SRC_RING is not in a full state, the process proceeds to operation S490.

In operation S490, the information regarding the packet is input to the ring IPV4_TO_INBOUND_IPSEC_SRC_RING between the packet classifier/forwarding microblock 220 and the inbound IPSec processing microblock 210. Thus, the inbound IPSec processing microblock 210 fetches the information regarding the packet stored in the ring IPV4_TO_INBOUND_IPSEC_SRC_RING and performs IPSec processing.

FIG. 5 is a view detailedly showing the IPSec core 215 illustrated in FIG. 2.

Referring to FIG. 5, the IPSec core 215 is composed of an initialization module 500 and a policy/SA management module 520.

The initialization module 500 performs a function of assigning memories to be used by the inbound IPSec processing microblock 210 and the outbound IPSec processing microblock 230, and a function of initializing symbol fetches, etc.

The policy/SA management module 520 receives a policy related to IP traffic and SA information related to an IPSec protocol from an IPSec application 290 performing a key exchange algorithm, and inputs or deletes the policy and SA information to or from the SRAM 540 existing in IXDP2851.

Information which is stored in a policy table and a SA table of the SRAM 540 is used in the inbound IPSec processing microblock 210 and the outbound IPSec processing microblock 230 when IPSec processing is performed, and is received from the IPSec application 290 through a PF_key socket interface.

The present invention may be embodied as a program stored on a computer readable medium that can be run on a general computer. Here, the computer readable medium includes but is not limited to storage media such as magnetic storage media (e.g., ROM's, floppy disks, hard disks, etc.), optically readable media (e.g., CD-ROMs, DVDs, etc.), and carrier waves (e.g., transmission over the Internet). The present invention may also be embodied as a computer readable program code unit stored on a computer readable medium, for causing a number of computer systems connected via a network to affect distributed processing.

The present invention relates to a method and apparatus for implementing an IPSec engine in IXDP2851 which is an IXP2850 network processor development platform.

The method and apparatus for implementing the IPSec engine in IXDP2851 can implement an IPSec engine without influencing a processing speed of general packets not requiring IPSec processing by separately processing packets requiring IPSec processing and packets not requiring IPSec processing.

Also, by using an encryption engine of an Intel IXP2850 network processor, it is possible to enhance processing performance of IPSec packets.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for implementing an IPSec engine in IXDP2851 which is an IXP2850 network processor development platform having a computer-readable storage medium, the apparatus comprising:

a memory;

the IXP2850 network processor, wherein the computer readable storage medium includes computer instructions which are configured for use in implementing the IPSec engine in the IXDP2851;

a packet classifier/forwarding microblock receiving a plurality of packets, and classifying at least one packet into an inbound packet in which a destination address of an IP header of the inbound packet indicates the packet classifier/forwarding microblock, and classifying at least one packet into an outbound packet in which a destination address of an IP header of the outbound packet does not indicate the packet classifier/forwarding microblock, using received packet information, determining whether IPSec processing should be performed on the inbound packet and the outbound packet, and performing packet forwarding on a packet not requiring the IPSec processing;

an outbound IPSec processing microblock performing IPSec processing on an outbound packet requiring IPSec processing according to packet information received from the packet classifier/forwarding microblock;

an inbound IPSec processing microblock performing IPSec processing on an inbound packet requiring IPSec processing according to the packet information received from the packet classifier/forwarding microblock; and an IPSec forwarding microblock receiving packet information of a packet subjected to IPSec processing from the outbound IPSec processing microblock and/or the inbound IPSec processing microblock, and performing forwarding on the corresponding packet, wherein the performed packet forwarding on the packet not requiring the IPSec processing comprises: storing the packet in a first DRAM and transmitting the packet from the first DRAM without influencing the packet's processing speed and without having to identify whether the packet requires IPSec processing for the performed forwarding on the corresponding packet; and wherein the packet classifier/forwarding microblock comprises a microengine that:

receives the packet information from the packet receiving microblock, and if the packet information indicates an inbound packet, a protocol of an IP header corresponds to ESP or AH, and the inbound packet requires IPSec processing, transmits the packet information of the inbound packet to the inbound IPSec processing microblock, if the packet information indicates an outbound packet and the outbound packet requires IPSec processing, transmit the packet information of the outbound packet to the outbound IPSec processing microblock, if the packet information indicates the inbound packet and the protocol of the IP header corresponds to neither ESP nor AH, performs packet forwarding on the inbound packet and adds an Ethernet header to the inbound packet subjected to the packet forwarding, if the packet information indicates the outbound packet and the outbound packet does not require IPSec processing, performs packet forwarding on the outbound packet, adds an Ethernet header to the outbound packet subjected to the packet forwarding, and transmits the packet information of the outbound packet to the packet queue management microblock, wherein the outbound IPSec processing microblock and the inbound IPSec processing microblock each fetch information required for the IPSec processing from a Security Association (SA) table stored in an SRAM of the IXDP2851, and each use an encryrtion engine of the IXP2850 network processor as an encryrtion algorithm for the packet.

2. The apparatus of claim 1, further comprising a packet receiving microblock regrouping packets received through an Ethernet MAC, writing the packets in the DRAM existing in the IXDP2851, and transmitting packet information regarding the packets to the packet classifier/forwarding microblock.

3. The apparatus of claim 1, further comprising a packet queue management microblock receiving packet information regarding a packet subjected to packet forwarding from the packet classifier/forwarding microblock, and causing the packet subjected to packet forwarding to have a scheduling function.

4. The apparatus of claim 3, further comprising a scheduler microblock controlling the packet queue management microblock so that a packet input to the packet queue management microblock has a scheduling function.

5. The apparatus of claim 3, further comprising a packet transmitting microblock receiving packet information regarding a packet from the packet queue management microblock, and transmitting a packet existing in the DRAM according to the packet information through an Ethernet interface.

6. The apparatus of claim 1, wherein the microengine of the packet classifier/forwarding microblock discards the inbound packet, if the packet information indicates the inbound packet, the protocol of the IP header corresponds to ESP or AH, and it is determined as a search result of a Security Association (SA) table that there is no SA to be applied.

7. The apparatus of claim 1, wherein the respective microblocks receive and transmit the packet information regarding the packet through a scratch pad ring formed between the microblocks.

8. A method for implementing an IPSec engine in IXDP2851 which is an IXP2850 network processor development platform having a computer-readable storage medium, the method, implemented using a computer that reads instructions stored on the storage medium, comprising:

receiving by a classifier/forwarding microblock, a plurality of packets, and classifying at least one packet into an inbound packet in which a destination address of an IP header of the inbound packet indicates the packet classifier/forwarding microblock, and classifying at least one packet into an outbound packet in which a destination address of an IP header of the outbound packet does not indicate the packet classifier/forwarding microblock, using received packet information, determining whether IPSec processing should be performed on the inbound packet and the outbound packet, and performing packet forwarding on a packet not requiring the IPSec processing;

if it is determined that the packet is the inbound packet, determining whether IPSec processing should be performed on the inbound packet, and transmitting information regarding the inbound packet to an inbound IPSec processing microblock if the IPSec processing should be performed on the inbound packet;

if it is determined that the packet is the outbound packet, determining whether IPSec processing should be performed on the outbound packet, and transmitting information regarding the outbound packet to an outbound IPSec processing microblock if the IPSec processing should be performed on the outbound; and if IPSec processing for the outbound packet is not required, performing packet forwarding on the outbound packet and adding an Ethernet header to the packet subjected to the packet forwarding, wherein the received packet not requiring the IPSec processing is stored in a first Dram and transmitted from the first DRAM without influencing the packet's processing speed and without having to identify whether the packet requires IPSec processing for the performed forwarding on the corresponding packet, wherein if it is determined that the packet is the inbound packet the operation further comprises:

determining whether an IP header protocol of the inbound packet is ESP or AH;

if the IP header protocol of the inbound packet is ESP or AH, searching a Security Association (SA) table stored in SRAM of the IXDP2851;

determining whether IPSec processing should be performed on the inbound packet, according to the search result of the SA table;

if it is determined that the IPSec processing should be performed on the inbound packet, transmitting information regarding the inbound packet to the inbound IPSec processing microblock; and if it is determined that the IPSec processing for the inbound packet is not required, discarding the inbound packet;

wherein if it is determined that the IP header protocol of the inbound packet corresponds to neither ESP nor AH, the packet classifier/forwarding microblock performs packet forwarding on the inbound packet and adds an Ethernet header to the inbound packet subjected to the packet forwarding;

wherein if it is determined that the packet is the outbound packet the operation further comprises;

searching a policy table stored in the SRAM of the IXDP2851 through an IP header of the outbound packet;

determining whether IPSec processing should be performed on the outbound packet, according to the search result of the policy table; and if it is determined that IPSec processing should be performed on the outbound packet, transmitting information regarding the outbound packet to the outbound IPSec processing microblock.

9. The method of claim 8, wherein, if an IP header of a packet corresponding to received packet information is valid, the packet classifier/forwarding microblock determines whether the IP header is valid, according to whether an IP header of a packet from which an Ethernet header is removed satisfies an RFC1812 specification.

\* \* \* \* \*